US010171607B2

(12) United States Patent
Hardin et al.

(10) Patent No.: US 10,171,607 B2
(45) Date of Patent: Jan. 1, 2019

(54) APPARATUS AND METHODS FOR MANAGING QUALITY OF EXPERIENCE DURING THE DELIVERY OF CONTENT

(71) Applicant: Time Warner Cable Enterprises LLC, New York, NY (US)

(72) Inventors: Glen Hardin, Charlotte, NC (US); Niem Dang, Sterling, VA (US); Kirk Erichsen, Greenwood Village, CO (US); Kamil Ince, Herndon, VA (US); Eduardo Cardona, Broomfield, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 216 days.

(21) Appl. No.: 14/229,555

(22) Filed: Mar. 28, 2014

(65) Prior Publication Data

US 2016/0044125 A1 Feb. 11, 2016

(51) Int. Cl.
*H04L 29/08* (2006.01)
*H04L 12/26* (2006.01)
*H04L 12/24* (2006.01)

(52) U.S. Cl.
CPC ........ *H04L 67/2823* (2013.01); *H04L 41/509* (2013.01); *H04L 41/5019* (2013.01);
(Continued)

(58) Field of Classification Search
CPC ............. H04L 12/5825; H04L 43/0876; H04L 67/2823
See application file for complete search history.

(56) References Cited

U.S. PATENT DOCUMENTS 6,345,038 B1 2/2002 Selinger
6,850,564 B1 * 2/2005 Pejhan ..................... H04N 7/14
348/404.1
(Continued)

OTHER PUBLICATIONS

TM Forum, "TM Forum IPDR Program", "https://web.archive.org/web/20110814123012/http://www.tmforum.org/ipdr/", Aug. 14, 2011, 2 pages.*

(Continued)

*Primary Examiner* — Jerry B Dennison
(74) *Attorney, Agent, or Firm* — Gazdzinski & Associates, PC

(57) ABSTRACT

Apparatus and methods for managing the quality of experience of delivery of content to end-point or user devices. In one embodiment, metrics data pertaining to network conditions being experience by consumer devices attached to a managed network are monitored by a network entity. The monitored metrics are analyzed to determine if a consumer device is experiencing poor network conditions, such as network congestion. Consumer devices that are identified as experiencing poor network conditions are reported to a content delivery network (CDN) entity responsible for providing IP-based content. The CDN entity adjusts content delivery files used by the consumer devices to request particular IP-based content to guide the consumer device to select a version of the content suitable for delivery over consumer device's existing network condition. The adjustment may include for instance removing formats deemed unsupportable for delivery over the existing network condition or identify a default format for the consumer device to use.

20 Claims, 9 Drawing Sheets

(52) U.S. Cl.
CPC ...... *H04L 41/5067* (2013.01); *H04L 43/0876* (2013.01); *H04L 41/0893* (2013.01)

(56) References Cited

U.S. PATENT DOCUMENTS

| | | | |
|---|---|---|---|
| 7,391,780 B1* | 6/2008 | Stone | H04L 41/0896 370/252 |
| 7,602,820 B2 | 10/2009 | Helms et al. | |
| 7,769,882 B1* | 8/2010 | Wong | H04L 41/147 370/468 |
| 8,134,930 B2* | 3/2012 | Seymour | H04L 41/147 370/231 |
| 8,312,164 B2* | 11/2012 | Vass | H04N 7/148 709/233 |
| 8,874,712 B2* | 10/2014 | Li | H04L 65/4084 370/232 |
| 9,082,092 B1* | 7/2015 | Henry | G06Q 10/06 |
| 9,313,138 B2* | 4/2016 | Sun | H04L 47/38 |
| 2003/0056217 A1 | 3/2003 | Brooks | |
| 2003/0163328 A1 | 8/2003 | Rambo et al. | |
| 2005/0262123 A1 | 11/2005 | Hirano | |
| 2007/0271590 A1* | 11/2007 | Gulas | H04L 65/4069 725/118 |
| 2008/0049787 A1 | 2/2008 | McNaughton et al. | |
| 2008/0235746 A1 | 9/2008 | Peters et al. | |
| 2009/0064254 A1* | 3/2009 | Henocq | H04L 47/10 725/116 |
| 2009/0180430 A1 | 7/2009 | Fadell | |
| 2009/0217081 A1 | 8/2009 | Maharana et al. | |
| 2010/0131672 A1 | 5/2010 | Karaoguz et al. | |
| 2010/0299552 A1 | 11/2010 | Schlack et al. | |
| 2011/0072127 A1 | 3/2011 | Gerber et al. | |
| 2011/0103374 A1 | 5/2011 | Lajoie et al. | |
| 2011/0302236 A1 | 12/2011 | Shrum, Jr. et al. | |
| 2012/0127881 A1 | 5/2012 | Wiley et al. | |
| 2012/0182864 A1* | 7/2012 | Heinz | H04L 12/5695 370/221 |
| 2012/0236930 A1* | 9/2012 | Gavade | H04N 19/00236 375/240.02 |
| 2012/0320789 A1 | 12/2012 | Wu et al. | |
| 2012/0320795 A1 | 12/2012 | Shukla et al. | |
| 2013/0091249 A1* | 4/2013 | McHugh | H04N 21/23439 709/219 |
| 2013/0163430 A1* | 6/2013 | Gell | H04N 21/23439 370/235 |
| 2013/0318251 A1* | 11/2013 | Mohammad | H04L 5/00 709/231 |
| 2014/0024383 A1 | 1/2014 | Rahman et al. | |
| 2014/0280878 A1 | 9/2014 | Hardin et al. | |
| 2014/0282784 A1 | 9/2014 | Pfeffer | |
| 2014/0330888 A1* | 11/2014 | Dave | H04L 67/42 709/203 |
| 2015/0012956 A1 | 1/2015 | Kim et al. | |
| 2015/0189535 A1* | 7/2015 | Bekiares | H04W 28/0226 370/230 |
| 2016/0044125 A1* | 2/2016 | Hardin | H04L 67/2823 709/219 |
| 2016/0112730 A1* | 4/2016 | De Vleeschauwer | H04L 29/06326 725/110 |

OTHER PUBLICATIONS

RFC 760, "Internet Protocol", Sep. 1981.*

* cited by examiner

APPARATUS AND METHODS FOR MANAGING QUALITY OF EXPERIENCE DURING THE DELIVERY OF CONTENT

RELATED APPLICATIONS

This application is related to co-owned and co-pending U.S. patent application Ser. No. 13/830,517 filed on Mar. 14, 2013 and entitled "APPARATUS AND METHODS FOR MANAGING SERVICE DELIVERY TELEMETRY", the foregoing being incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content and/or data delivery over a network. More particularly, the present disclosure is related, in one exemplary aspect, to apparatus and methods for management of quality of experience for content delivery.

2. Description of Related Technology

Digital video has traditionally been delivered to clients without buffering in a real-time fashion with a central controller managing the network configuration of different services, whether delivery is broadcast, on-demand, or switched service. With the proliferation of Internet Protocol (IP) content and buffered clients, the client is principally responsible for determining the optimal Quality of Experience (QoE) at individual endpoints. Within these buffered client architectures, clients are given a manifest file or index containing the various bitrates and encodings of requested video content, often referred to as video profiles. Upon initiating delivery of a stream of content, the endpoint device (e.g., client device) algorithmically selects a particular video profile, for example the profile with the highest bit rate/quality, based on network capacity (or prediction thereof) from the perspective of the endpoint device.

Present IPTV solutions are based on "best-effort" delivery principles, and do not guarantee a Quality of Service (QoS). In such best-effort service, minimum performance metrics such as bit rate, latency, jitter, or loss are not guaranteed. IPTV video streaming over best-effort services incorporates feedback mechanisms into the IP endpoints (e.g., client devices) that allow the video streams to be adapted to the current network conditions as observed from the endpoint in real-time, such as via the use of Adaptive Bitrate (ABR) systems. However, from the perspective of an endpoint user, IPTV content may suffer from protracted and distracting effects of conditions such as (i) slow start-up negotiation of a format for delivering the requested video content, (ii) mid-program resolution changes of the video content, and occasionally (iii) a total failure of the video stream delivery.

In Hypertext Transport Protocol (HTTP) based video delivery paradigms, video may not be continually streamed to the client device per se, rather the client may perform a series of requests for blocks or portions of the video content. In one common implementation, the client device monitors an internal playout buffer before requesting the next block of video data. The client device may for example continually monitor and predict its own buffer under-run condition (i.e., the buffer draining faster than it is being replaced by the incoming content). Upon experiencing an under-run condition, the client may request to downshift from the current bitrate content to a lower bitrate selection, guided by what the client either measures or predicts about network capacity of the link. The downshift is an attempt on the part of the client device to avoid starvation of its buffers that can cause visual and audio faults or discontinuities in the playback of content, thereby negatively impacting the QoE (quality of experience) for a user.

At a high level, transitioning a network to IP content delivery has a number of benefits for Managed System Operators (MSO). Such benefits include (i) the ability to offer branded content and enhanced video services, (ii) reduced equipment costs in both the head-end and customer premises, (iii) emergence of the software client as a means of playing video content on a wide range of consumer equipment devices, (iv) ease of integration with open standards (e.g., HTML 5), and (v) the ability to match or exceed the quality of experience provided by traditional digital video transport over e.g., Quadrature Amplitude Modulation (QAM). Furthermore, IP is agnostic to the access medium used to deliver the content.

However, the Federal Communications Commission (FCC) has challenged Internet Service Providers (ISP) and operators to conform to a mandate, commonly known "Network Neutrality". Network Neutrality is intended to limit what ISPs are allowed to control with regards to the traffic transported over their network. In particular, network policies which impact the content of a competitor relative to the ISP or operator's own content are expressly forbidden. Accordingly, a MSO may violate Network Neutrality rules by implementing Quality of Service (QoS) for the MSO's own IP content in an effort to improve the IP content delivery (as compared to best-effort service techniques).

Hence, flexible management tools and methods for managing a user's quality of experience of IP content delivery over a network (including addressing potential issues raised by Network Neutrality) represents one salient need presented by the foregoing situation. Ideally, such tools and methods should allow for implementation of services for managing quality of experience within a wide variety of network architectures and delivery paradigms.

SUMMARY

The present disclosure addresses the foregoing needs by disclosing, inter alia, apparatus and methods for management of quality of experience for IP-based content delivery.

In one aspect, a method for adjusting content delivery over a content delivery network is disclosed. In one embodiment, the method includes: monitoring one or more performance metrics associated with at least a portion of the network, adjusting content delivery for one or more user devices based at least on the monitored one or more performance metrics, and providing data relating to the adjustment to respective ones of the one or more user devices.

In a second aspect, a network apparatus configured to deliver internet protocol (IP)-based content is disclosed. In one embodiment, the network apparatus includes a processor, one or more network interfaces in data communication with the processor, and a computer-readable storage apparatus in data communication with the processor and having a non-transitory storage medium with at least one program stored thereon. The at least one program configured to, when executed, cause the network apparatus to: receive data related to a network condition status affecting one or more consumer devices, adjust one or more content delivery files associated with individual video content of a plurality of available video content, the content delivery files configured to permit a consumer device to receive video content associated therewith, the adjustment based at least in part on the received data, and deliver the one or more adjusted content delivery files to at least one of the one or more consumer devices.

In a third aspect, a computer-readable storage apparatus is disclosed. In one embodiment, the computer-readable storage apparatus includes a non-transitory storage medium with at least one program stored thereon. The at least one program is configured to, when executed, cause a network device to: receive a plurality of data relating to performance metrics of a plurality of consumer premise equipment (CPE) connected to a managed network, derive a network condition status for the plurality of CPE based on the received plurality of data, determine that a derived network status of a CPE of the plurality does not meet at least one performance criterion, and notify a content delivery device of the respective network status of the CPE not meeting the at least one criterion.

In a fourth aspect, a method of delivering Internet Protocol (IP) content to a user device via a content delivery network is disclosed. In one embodiment, the method includes: identifying, substantially in real time, one or more portions of the network experiencing reduced capacity for delivery of the IP content, and based at least in part on the identifying, dynamically modifying one or more available variants of a given content element available to the user device so as to maintain a prescribed user service quality for said IP content delivery to the user device.

These and other aspects become apparent when considered in light of the disclosure provided herein.

Figure 1:
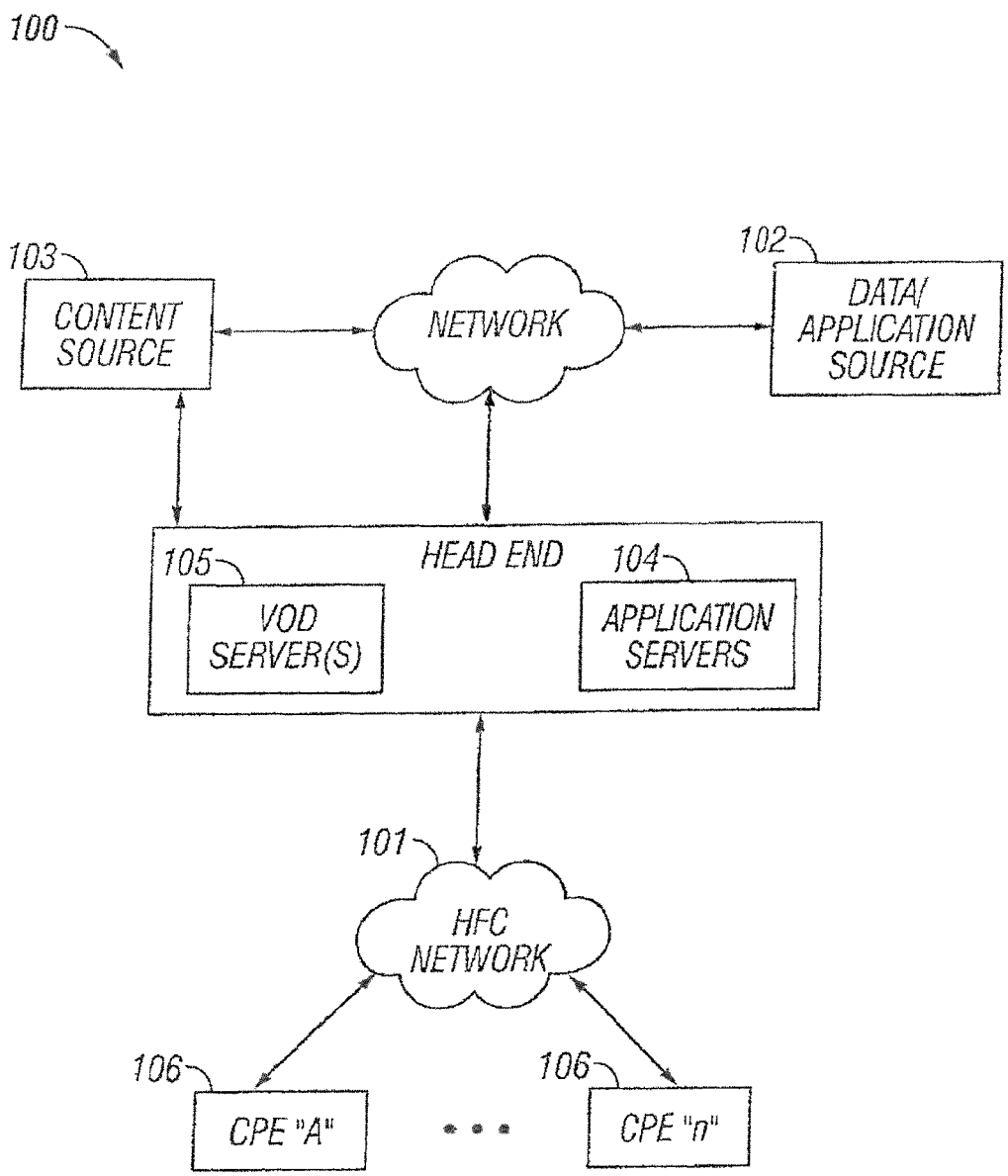
FIG. 1 is a functional block diagram illustrating an exemplary hybrid fiber network configuration useful with various aspects of the present disclosure.

All Figures © Copyright 2014 Time Warner Cable, Inc. All rights reserved.

DETAILED DESCRIPTION

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, OLEDs, incandescent and fluorescent devices. Display devices may also include less dynamic devices such as, for example, printers, e-ink devices, and the like.

As used herein, the term "endpoint" refers without limitation to a component or entity that consumes or uses data or content, and does not denote any particular architecture or configuration. For example, an "endpoint" may in fact be a physical (topological) intermediary entity or node within a network, but a logical endpoint for content. Alternatively, an endpoint may be both a physical and logical endpoint.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), or IrDA families.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

Overview

In one salient aspect, the present disclosure provides apparatus and methods for managing the quality of experience of delivery of packetized (e.g., IP-based) content to end-point devices. In one embodiment, metrics data pertaining to network conditions being experienced by one or more consumer devices attached to a managed network are monitored by a network entity. The monitored metrics are analyzed to determine if the consumer device(s) is/are experiencing poor network conditions, such as network congestion. Consumer devices that are identified as experiencing poor network conditions are reported to a content delivery network (CDN) entity responsible for providing IP-based content. The CDN entity adjusts content delivery files used by the consumer devices to request particular IP-based content, so as to cause the consumer device to select a version of the content suitable for delivery consistent with the consumer device's existing network condition.

In an exemplary implementation, a cable modem termination system (CMTS) reports the metrics data of consumer devices (e.g., consumer premises equipment or CPE, such as settop box, IP-enabled gateway, user's IP-enabled mobile device, etc.) in data communication therewith to an IPDR management entity, using Internet Protocol Delivery Record (IPDR) service definitions. The IPDR management entity determines if a consumer device is experiencing a poor or otherwise non-optimal network condition based on the IPDR service definition data. The IPDR management entity reports consumer devices experiencing such poor network conditions to a CDN Video Packager configured to maintain manifest files associated with individual IP-content. Upon receiving a request for content from a consumer device identified as experiencing such poor network conditions, the CDN Video Packager provides the consumer device with a modified manifest file associated with the requested content. The modified manifest file is configured to aid the consumer device to select a suitable format based on the network condition. The modification may include removing formats deemed unsupportable for delivery over the existing network condition, and/or identification of a default format for the consumer device to at least initially use.

Accordingly, by adjusting content delivery based on monitored network conditions which may not be otherwise perceivable by a consumer device, the consumer device is more likely to select a version of requested content that is supportable by the current network conditions, thereby improving a user's quality of experience by, inter alia, avoiding under-run conditions and the like.

DETAILED DESCRIPTION OF EXEMPLARY EMBODIMENTS

Exemplary embodiments of the apparatus and methods of the present disclosure are now described in detail. While these exemplary embodiments are described in the context of a managed hybrid fiber coax (HFC) cable system architecture having a multiple systems operator, digital networking capability, and plurality of client devices/CPE, the general principles and advantages of the disclosure may be extended to other types of networks and architectures, whether broadband, narrowband, wired or wireless, terrestrial or satellite, managed or unmanaged (or combinations thereof), or otherwise, the following therefore being merely exemplary in nature.

It will also be appreciated that while described generally in the context of point-to-point IP-based content delivery (e.g. IP video streaming), the present disclosure may be readily adapted to other types of IP-based delivery (e.g., IP-based content multicasts, etc.) as well. Myriad other applications are possible.

Further, although described in the context of service provision over a managed network, the architectures and techniques described herein may be readily applied to external or non-managed network management. The managed network embodiments presented are merely used to demonstrate the flexibility and general applicability of the principles described herein, and should not be considered in any way limiting. For example, the performance metrics or network conditions discussed herein may be reported to a managed or unmanaged content delivery network external to the managed network, to other network entities within the managed network, and so forth.

In addition, while the disclosure refers at numerous points to one or more internet protocol television (IPTV) embodiments, the principles of the disclosure are contemplated in other applications, such as video services (e.g., network DVR, second screen apps, cloud based digital navigators, OnDemand or over-the-top (OTT) content (e.g., Netflix®, Hulu®, virtual MSO services, etc.)), visual communications (i.e., Skype®, Facetime®, etc), or cloud computing/storage/streaming services. All such embodiments and uses are contemplated within the scope of the present disclosure.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Bearer Network—

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below), or others, may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers premises" (or other locations, whether local or remote to the distribution server 104) that can be accessed by a distribution server 104.

Figure 1A:
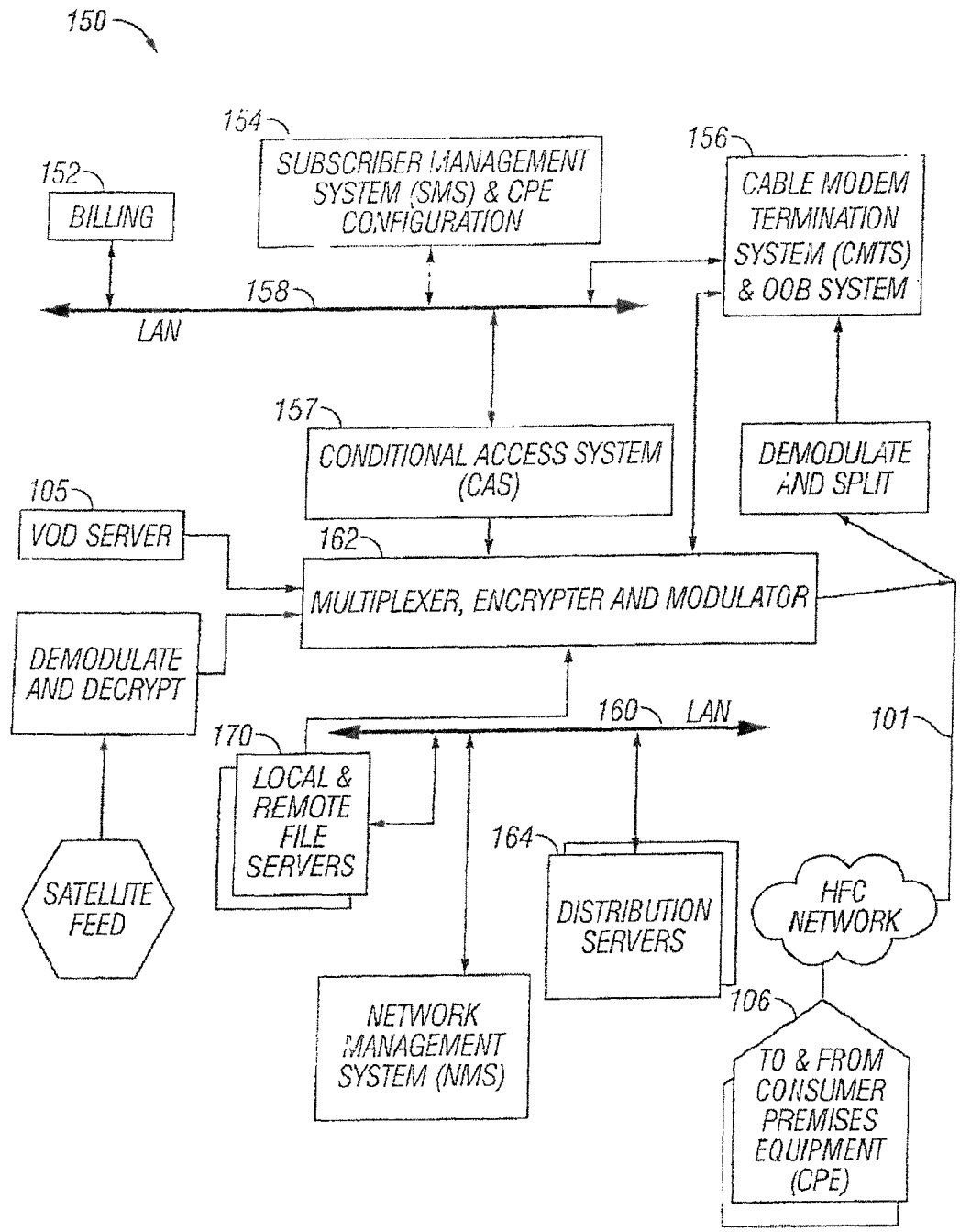
FIG. 1a is a functional block diagram illustrating one exemplary embodiment of a network headend configuration.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
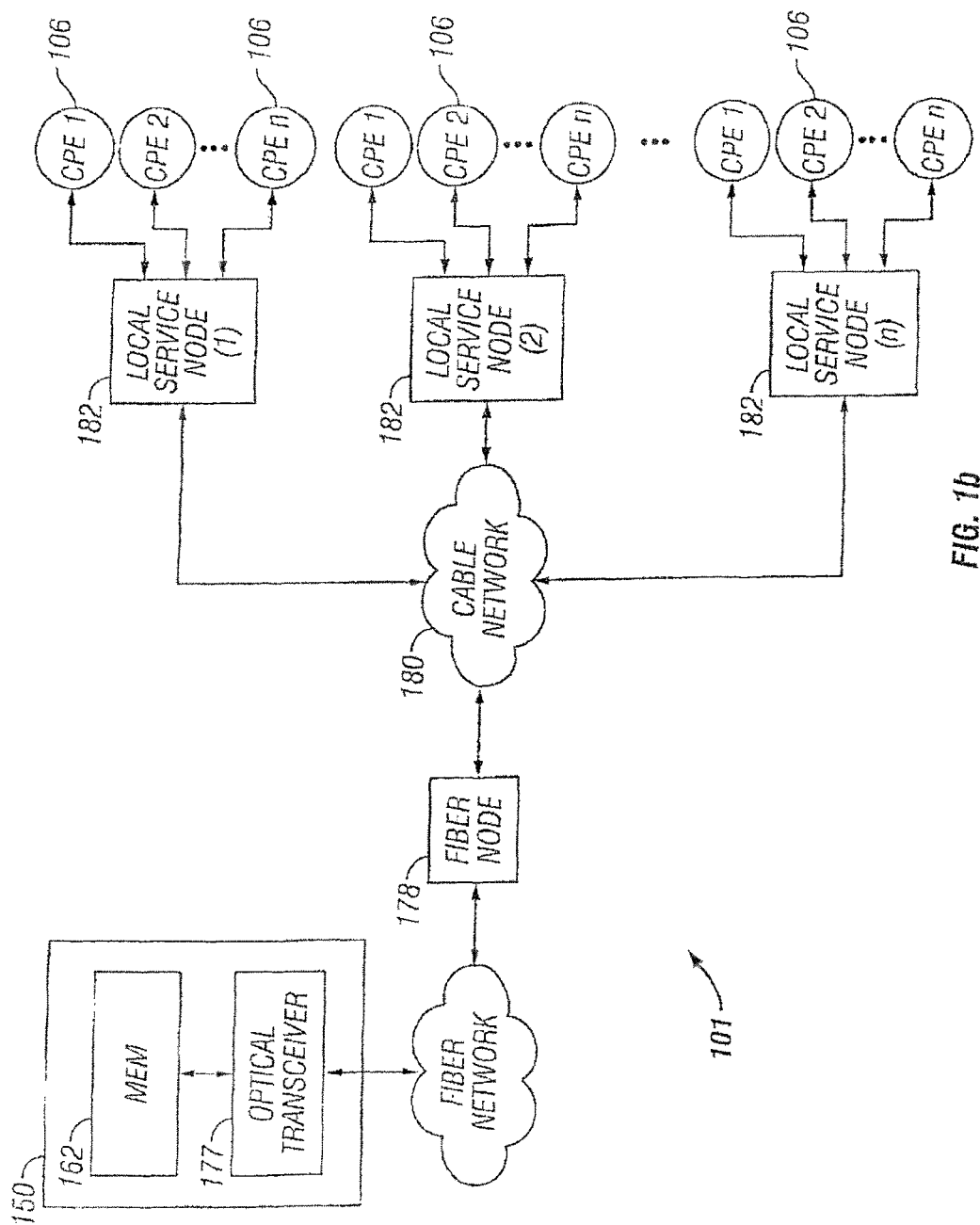
FIG. 1b is a functional block diagram illustrating one exemplary embodiment of a local service node configuration useful with various aspects of the present disclosure.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
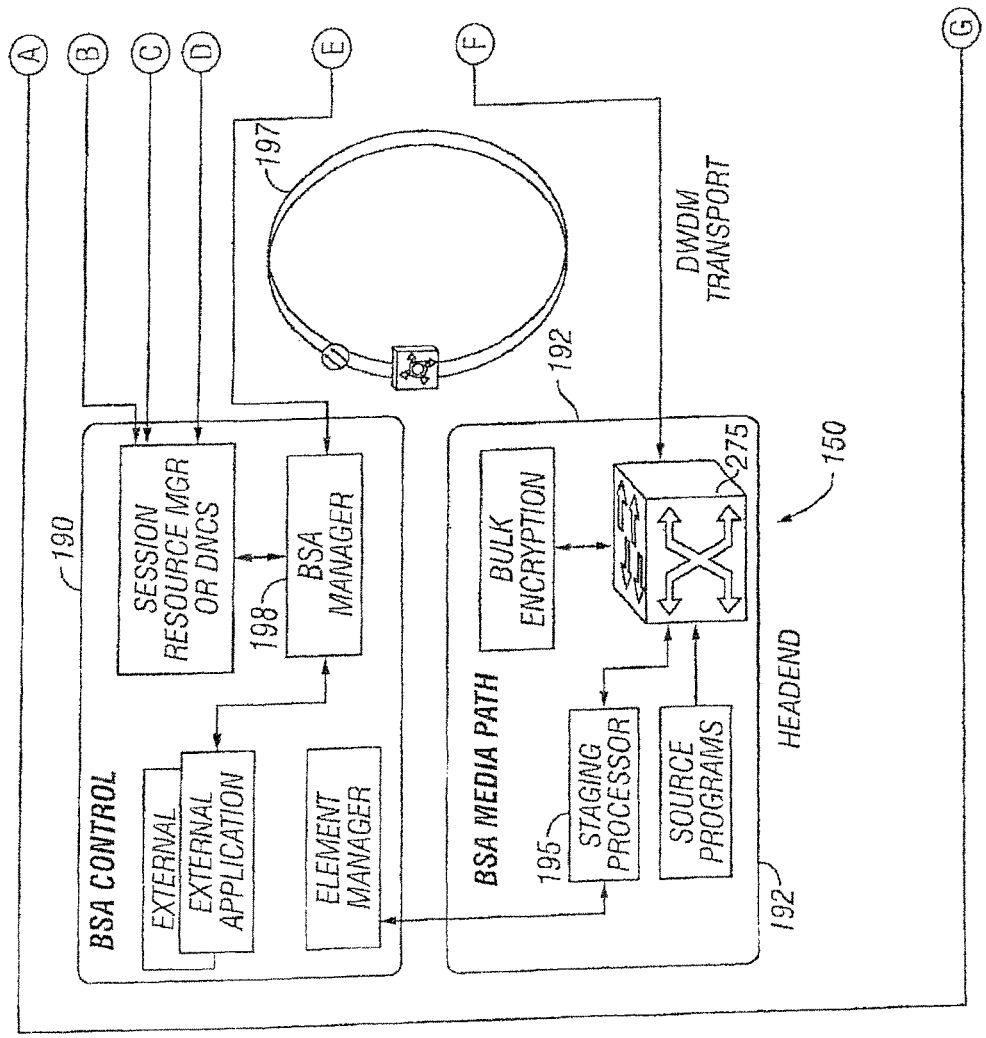
FIG. 1c is a functional block diagram illustrating one exemplary embodiment of a broadcast switched architecture (BSA) network.
Figure 1C:
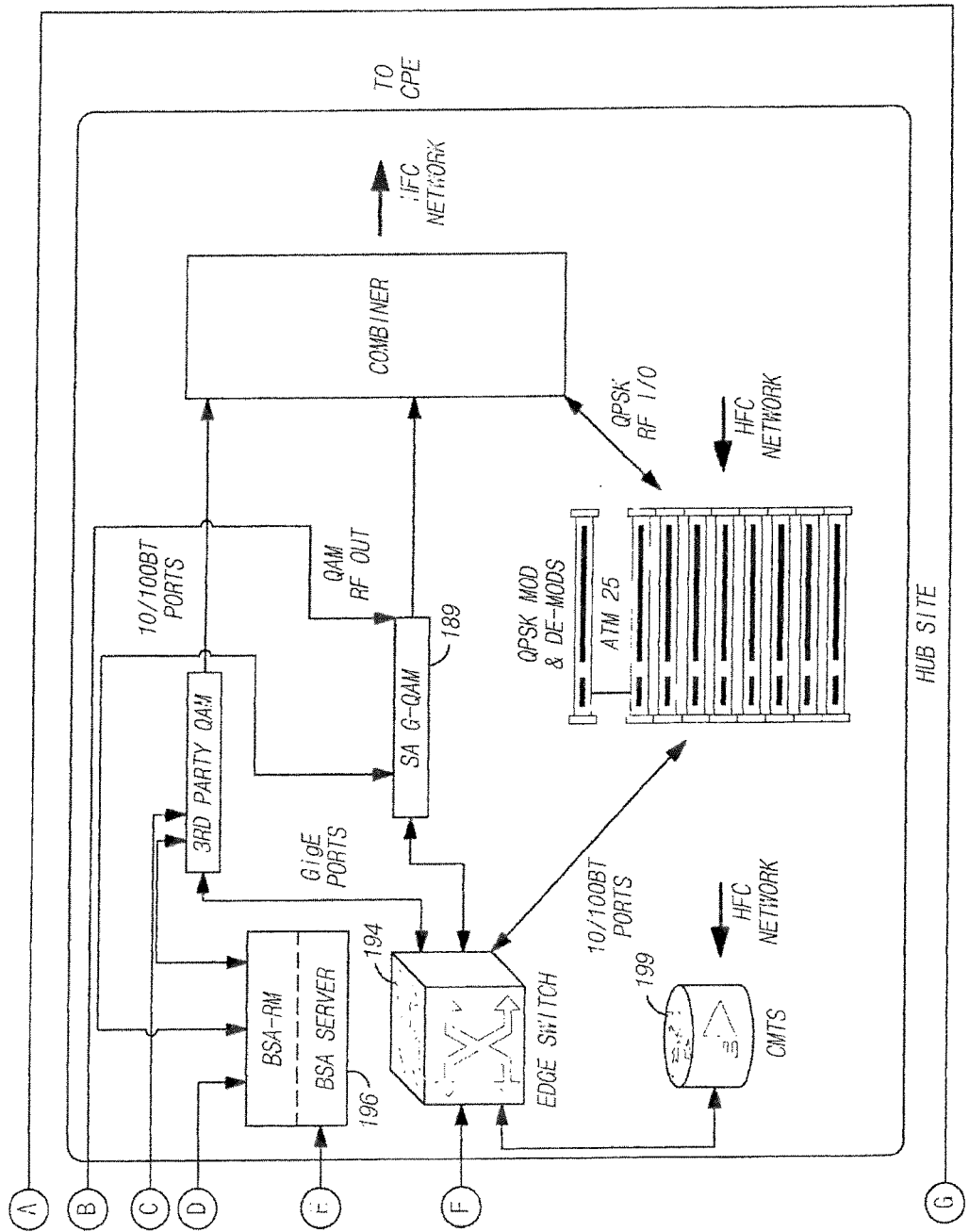

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks—

FIG. 1c illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. Patent Application Publication No. 2003/0056217 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1*a* and 1*c* (and 1*d* discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1*c*, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Packetized Content Delivery Network—

Figure 1D:
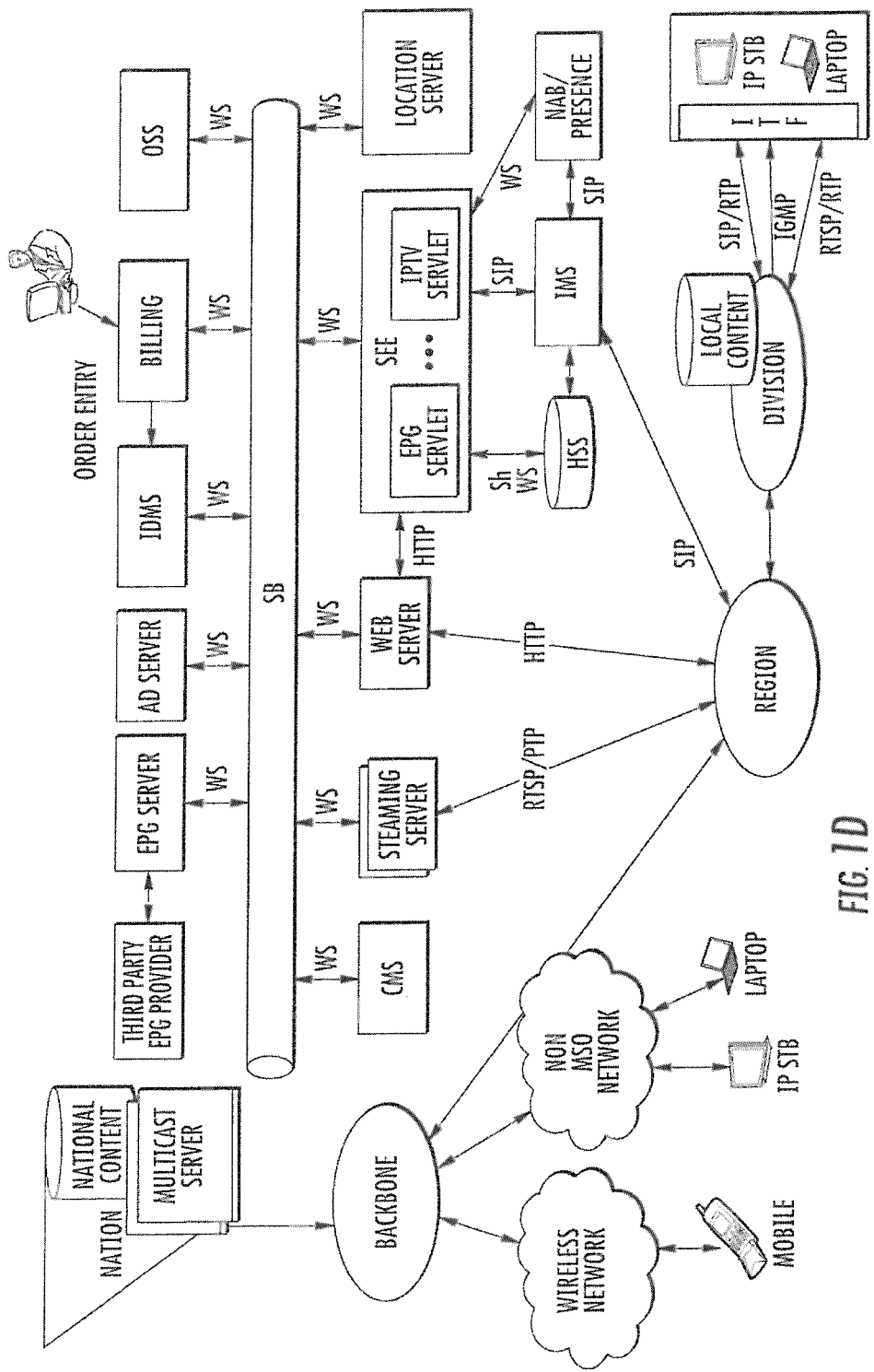
FIG. 1d is a functional block diagram illustrating one exemplary embodiment of a packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1*d* illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Managed Quality Architecture—

Figure 2:
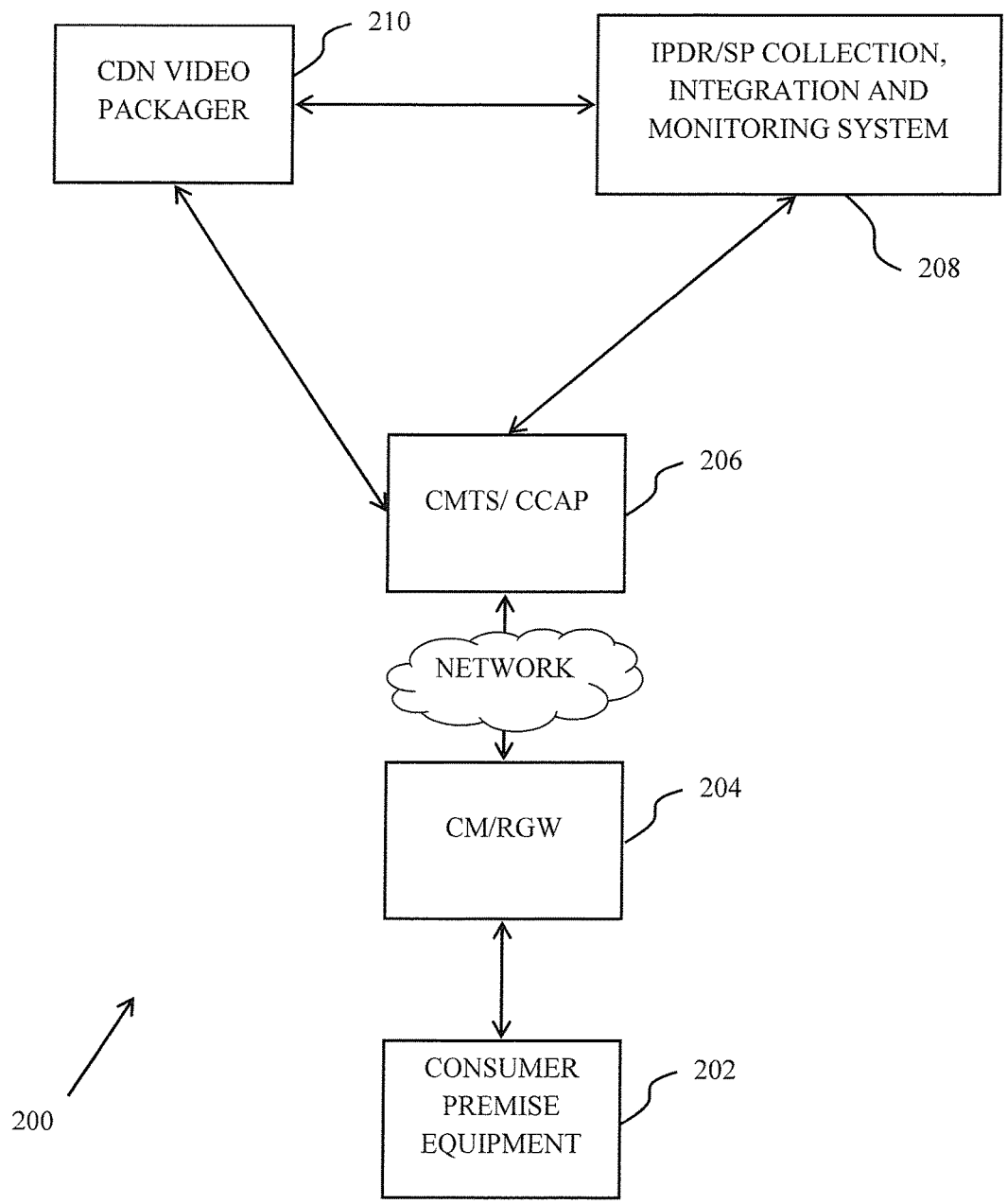
FIG. 2 is a functional block diagram illustrating one exemplary embodiment of an Internet Protocol Detail Recording/Streaming Protocol (IPDR/SP) Architecture according to the present disclosure.

FIG. 2 is a block diagram illustrating an exemplary network architecture 200 for enabling managed QoE over an operator managed network (such as those of FIGS. 1-1*d* discussed above), configured in accordance with one embodiment of the disclosure. In the exemplary embodiment, the architecture 200 is based on use of IPDR/SP (Internet Protocol Detail Recording/Streaming Protocol). Advantageously, IPDR/SP provides efficient network monitoring telemetry without requiring a polling overhead, such as the polling overhead associated with Simple Network Management Protocol (SNMP).

Historically, IPDR has been used in the managed network context primarily to support per-service-flow usage accounting. However, Data Over Cable Service Interface Specification (DOCSIS) 3.0 defined additional IPDR Service Definitions (SD) to provide a richer set of network performance and monitoring metrics. DOCSIS 3.0 additionally defined a number of SDs for a wide variety of use cases beyond usage measurement such as interface utilization. There are separate SDs for monitoring upstream and downstream utilization. By using this utilization data, congestion may be readily determined.

The exemplary illustrated network entities and apparatus are configured to operate within one or more of various the above-described bearer networks of FIGS. 1-1*d*, although others may readily be used. The network may be based on wireless and/or wireline networking technologies (e.g., Wi-Fi family 802.11, WiMAX 802.16, wired Ethernet standards (802.3), optical standards such as SONET, etc.). The technologies forming the bearer networks may also range in scope from PAN (personal area networking) or "mesh" networking, all the way to nationwide or even global architectures, and everything in-between). It will also be appreciated that bridges may be used to create a hybrid network environment using multiple ones of such technologies (e.g. wireless/wired Ethernet hybrid).

As shown, the network architecture 200 generally includes one or more consumer premise equipment (CPE) 202 in data communication with a cable modem (CM) or residential gateway (RGW) device 204. Network connectivity is served to the CM/RGW by a cable modem termination system (CMTS) or a Converged Cable Access Platform (CCAP) 206. In the illustrated embodiment, the CMTS/CCAP 206 is configured to provide data to the IP Detail Recording/Streaming Protocol (IPDR/SP) Collection, Integration, and Monitoring System (CIM) 208. The provided data may include for example network topology information (such as the relationships between a CM/RGW 204 and one or more RF channels), data activity of CPE 202 attached to or in communication with the CM/RGW 204, and network conditions (such as a channel utilization). The exemplary implementation of the IPDR/SP CIM 208 provides data on network conditions experienced by the CPE 202 to a Content Delivery Network (CDN) supervisory entity, such as the exemplary Video Packager 210. The provided data may pertain to the entirety of monitored CPE 202 devices or subsets or portions thereof (e.g., the data may be limited to CPE 202 which are experiencing poor network conditions as determined by the IPDR/SP CIM 208).

In one implementation, when a CPE 202 desires to receive selected video content for playback, the CPE 202 requests the manifest file associated with the selected video content from the CDN Video Packager 210. The CPE 202 request is routed to the CDN Video Packager 210 via the CM/RGW 204 through the CMTS/CCAP 206. Upon receiving the manifest file request, the CDN Video Packager 210 selects an appropriate manifest file to transmit to the requesting CPE 202. Selection of such an appropriate manifest file is discussed in greater detail below.

Once the CPE 202 receives the manifest file, the CPE 202 is configured to select a video profile, according to various methods as discussed herein, to playback the selected video content.

The CDN Video Packager 210 is configured to use the provided data (i.e., that related to network conditions and possible congestion or other deleterious conditions) to adjust the manifest files provided to the CPE devices 202. The adjustment may include adding or removing one or more video profiles from the manifest list. For example, the CDN Video Packager 210 may remove video profiles with higher bitrates for a CPE 202 experiencing network congestion. By removing the higher bitrate profiles (which necessarily require higher network capacity/bandwidth for delivery), the CPE 202 will be less likely to encounter buffer underrun, thereby improving the QoE of the respective CPE user. The adjustment of the manifest file may further include for example setting a default video profile for a CPE 202 based on the received data, thereby obviating the need for negotiating a start-up video profile by a CPE 202. In addition, because the CDN Video Packager 210 is using monitored network condition data (which otherwise is unavailable to the CPE 202) to select the default video profile, the QoE may be improved, by reducing the chance of potential underrun conditions in comparison with a video profiled selected solely by a client device.

The adjustment of the manifest files may occur at the time that the file is requested by the client device. The manifest files may also or alternatively be adjusted on an on-going basis independently of, or in addition to, client device requests. For example, in one variant, adjustments are only made in response to requests. In another variant, adjustments are made both in response to requests, or periodically (e.g., every X minutes), or upon occurrence of one or more other events (such as when sufficient resources become available to perform the adjustment, or "mid-stream" during delivery after a request has been received, but upon detection of a degradation of QoE or rise in network congestion). Myriad other combinations/possibilities for conditions triggering an adjustment will be recognized by those of ordinary skill given the present disclosure.

In various implementations, the CDN Video Packager 210 may group, or otherwise associate, one or more CPE devices 202 based on the provided data. Accordingly, an adjusted manifest file may be associated with a designated group of CPE 202, or merely adjust manifest files on a per-CPE request basis. The CDN Video Packager 210 may reorganize the groups based on the data provided by the on-going monitoring of the CPE network conditions. Thus a CPE 202 which was grouped into CPE experiencing good network conditions may be later reassigned to a group of CPE experiencing poor network conditions, or vice versa, depending on additional data received from the IPDR/SP CIM 208.

Methods—

Figure 3:
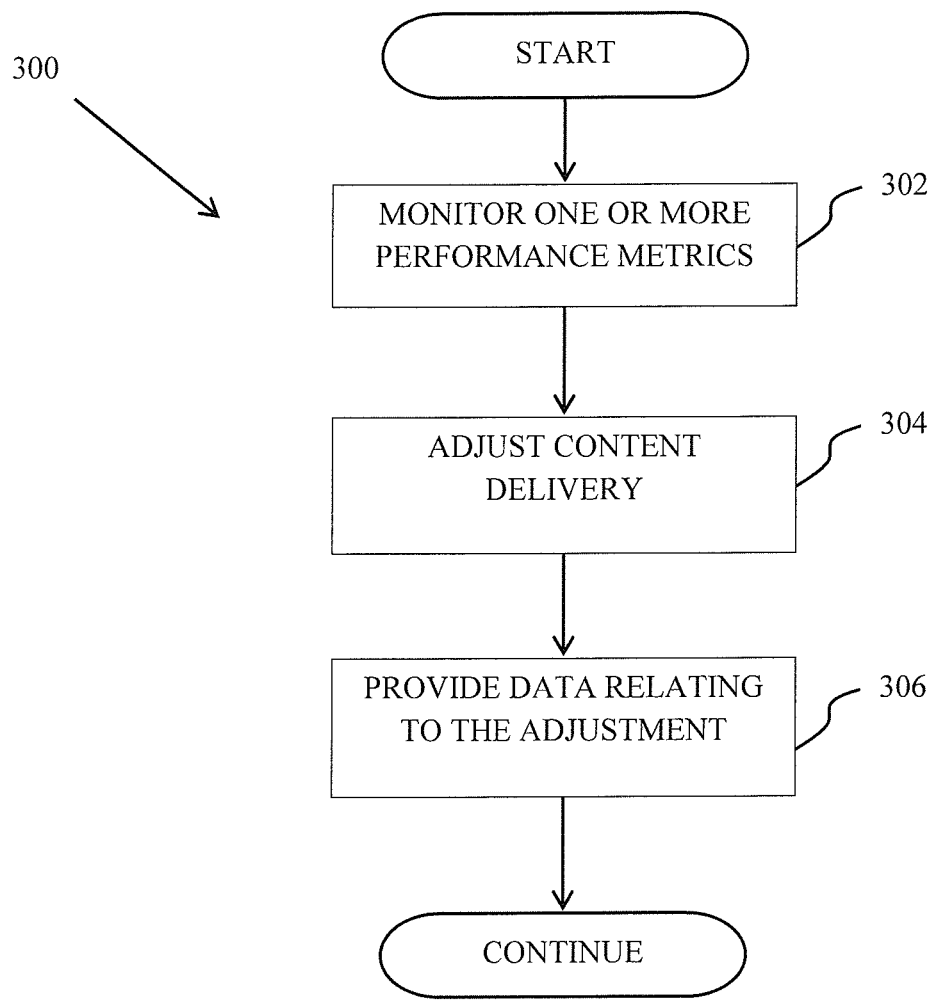
FIG. 3 is a logical flow diagram illustrating an exemplary embodiment of a method for managing Quality of Experience (QoE) of packetized content delivery according to the present disclosure.

Referring now to FIG. 3, a flowchart illustrating one embodiment of a method 300 for managing Quality of Experience of packetized content delivery is shown.

At step 302, one or more network performance metrics of consumer premise equipment are monitored. The performance metrics are collected in one embodiment for consumer premise equipment (CPE) attached to the wide area network (WAN) of a service provider, such as an MSO or ISP. The monitored one or more network performance metrics are configured to be indicative of a connection quality of a particular CPE attached to the network. The quality of the connection may pertain to the downstream or upstream connection of the CPE, or both, and may be determined in one implementation by the utilization (e.g., used bandwidth of a total available bandwidth) of the upstream and downstream of a device. By using utilization data, congestion of device interfaces can be readily determined. In one embodiment, the performance metrics are received on a periodic basis. Alternatively, the performance metrics may be polled on an "as-needed" basis; e.g., upon initiation or receipt of a request for content, or according to yet other schemes as previously described herein.

In another embodiment, the one or more performance metrics are monitored in real-time. Real-time monitoring provides a proactive detection capability that may be able to anticipate deteriorating conditions before the conditions become critical to the content delivery. In addition, real-time analysis may reduce the time required for a client device to take corrective action in the event of failures or error conditions in the content delivery cause by, for example, a congested interface.

As a brief aside, congested interfaces can lead to packet loss, delay, and jitter which can lead to a lower so-called "goodput" (packets received without error). In ABR systems, lower goodput tends to cause ABR codecs to adapt to a lower bit rate to allow for the controlled degradation of the content (as opposed to a complete failure of a content stream). In some HTTP Live Streaming (HLS) implementations, a first encoding (a.k.a. alternate) listed in the manifest is used as the startup encoding for the stream. The an application running on a client device subsequently looks at trends in measured network throughput to determine when to increase or decrease the bitrate of the requested encoding. However, the first encoding is performed at a bitrate that is incapable of being adequately serviced under current network congestion, which may possibly lead to a temporary halt in playback due to an underrun condition. In other adaptive protocols, a client device may autonomously select the initial bitrate of the codecs from the manifest file without any knowledge of the network conditions in order to inform the bitrate selection. Often endpoint devices request the highest quality encoding (which is also the highest bitrate) at start. Adding a high bitrate video stream to an interface which is already congested not only can increase the congestion, but can also lead to a lower QoE due to startup negotiation delays and other service quality issues.

In one embodiment of the present disclosure, the performance metrics are provided by a CMTS/CCAP providing network access to a CM/RGW (and their associated CPE). In one particular implementation, the performance metrics are directly indicative of a network condition experienced by a CM and/associated CPE, as discussed in greater detail below. In another implementation, the performance metrics can be used to derive the network condition experience by a CM and/or CPE. In some such derivative implementations, the performance metrics are derived by a series of DOCSIS 3.0 Service Definitions. The CPE Service Definition (as shown in Table 1) may be used to identify which client devices are associated to a CM in communication with the CMTS/CCAP. For example, by known the IP address of a CPE, the IP address may be used to associate the CPE with network congestion information.

TABLE 1

| Definition | Description |
| --- | --- |
| CmtsHostName | Host name of the CMTS |
| CmtsSysUpTime | Relative timestamp for when the CMTS was last rebooted |
| CmtsMdIfName | MAC domain interface name |
| CmtsMdIfIndex | MAC domain interface index |
| CmMacAddr | Cable modem MAC address |
| CpeMacAddr | MAC address of an CPE attached to the CM |
| CpeIpv4AddrList | CPE IPv4 address(es) associated with the CPE MAC |
| CpeIpv6AddrList | CPE IPv6 address(es) associated with the CPE MAC |

In addition, in some implementations, the Subscriber Account Management Interface Specification (SAMIS) Service Definitions are used to determine the relationship between a CM and channels/interfaces. Specifically, DOCSIS 3.0 defines two different SAIMS Service Definitions, Type 1 and Type 2, where Type 2 is a compact subset of Type 1. Exemplary SAIMS Service Definitions useful with the present disclosure are shown in Table 2.

TABLE 2

| Definition | Description |
| --- | --- |
| CmtsHostName | Host name of the CMTS |
| CmtsSysUpTime | Relative timestamp for when the CMTS was last rebooted |
| CmtsMdIfName | MAC domain interface name |
| CmtsMdIfIndex | MAC domain interface index |
| CmMacAddr | Cable modem MAC address |
| RecCreationTime | Absolute timestamp of the time the associated counters were sampled |
| ServiceFlowChSet | Array of Channel IDs this Service Flow traverses |
| Service Identifier | Identifier of the Service Flow |
| ServiceClassName | Service class name associated with the Service Flow |

Furthermore, a CM/RGW may have different service flows bonded to different channel sets. The Service Class Name can be utilized to identify the service flows that are relevant to a managed IP video service. For example, IP video may be offered as an application over a service flow, but different operators may implement various approaches. In addition, by using the service class name (e.g., ServiceClassName) to determine the relevant channels for the IP video service, "false positives" of network condition problems may be avoided. In an illustrative example, a CM may have two downstream (DS) service flows, one of which is a telephony service operating over channel 1, while the other is a bonded high speed data (HSD) service flow (used in managed IP video service) over channels 4, 5, 6, and 7. Accordingly, performance metrics associated with channel 1 may be ignored as not being relevant to the IP video service.

The CM-to-channel/interface may also be determined via a CM registration status service definition. However, using this service definition deals primarily with channel group identifications, which may need to be resolved to the individual channels which make up a given service group.

Furthermore, performance metrics related to the congestion of downstream channels may be determined from a downstream service definition, providing information such as shown in Table 3.

TABLE 3

| Definition | Description |
| --- | --- |
| CmtsHostName | Host name of the CMTS |
| CmtsSysUpTime | Relative timestamp for when the CMTS was last rebooted |
| CmtsMdIfIndex | MAC domain interface index |
| DsIfIndex | Index of the interface |
| DsIfName | Name of the interface |
| DsChId | Channel ID of the interface |
| DsUtilInterval | Period over which the utilization was calculated |
| DsUtlIndex-Percentage | The interface utilization as a percentage of full capacity |

The DsChId (Downstream Channel ID) provides a link between the channel and the ServiceFlowChSet (Service Flow Channel Set) from the SAIMS Service Definition. The DsUtlIndexPercentage (Downstream Utilization Index Percentage) provides an indication as to whether or not a give channel is congested during the measurement period.

By linking the CPE IP addresses to the CM MAC (via the CPE service definition), CM MAC addresses to channel set(s) (via one of the SAMIM service definitions), and then measuring the interface utilization with the downstream utilization service definition, the control plane can be informed of statistics necessary to determine which end points are behind (i.e., serviced by) CMs which are connected to congested links.

In one implementation, the monitoring comprises identifying CPE that are experiencing poor network conditions based on the determined congestion. The identification may be based for example on comparing a level of determined congestion against one or more preset or dynamically determined thresholds. The identification of the network condition may also comprise associating each monitored CPE with a level of network congestion (e.g., 1-10 scale, or fuzzy logic variable such as "low", "moderate", and "heavy" congestion). By associating each CPE, or a subset thereof, with multiple levels of monitored network congestion, varying levels of content delivery may be performed based on the associated level of determined congestion per step 304.

At step 304, the content delivery is adjusted based on the monitored one or more performance metrics. In one embodiment, the adjustment is performed by manipulating information used by a CPE to request content from a content delivery network. Accordingly, for CPE experiencing poor network conditions, the information may be manipulated to restrict a CPE from requesting content of certain bitrates that are perceived not to be sustainable by the existing network conditions, or conversely cause the CPE to only select content with bitrates that are sustainable. For example, in an implementation in which a CPE, by default, is configured to initialize content delivery by selecting a video profile with the highest bitrate, the provided list may provide a limited set of video profiles that will provide lower start-up delay under current existing network conditions. Additionally, a default bitrate may be identified in accordance with the existing network condition of which a CPE may otherwise be unaware.

By basing content selection on the monitored one or more performance metrics, the initial bitrate selection by a CPE may be performed based on actual existing network conditions, thereby reducing startup delays and defects in the playback that negatively affect the user's QoE. In one implementation, the adjustment occurs when a CPE requests a manifest file as part of a content request. Alternatively, the adjustment occurs on an on-going basis. The on-going basis may be e.g., continuous, periodic, and/or triggered upon an occurrence of an event such as, for example, a detected change in a congestion level associated with one or more CPE.

In another embodiment, the content delivery is adjusted by assigning the CPE to service groups used for content delivery. For example, in one implementation, the CPE are assigned to groups based on their monitored performance metrics. Accordingly, CPE which are experiencing similar network conditions may be grouped together into a service group. The similarity may be based on a multitude of different factors, such as for example, network congestion and/or packet loss. The level of similarity may be determined through the use thresholds, performance tolerances, or various other algorithms. In addition, other factors may be considered such as a subscription level associated with a user account of a respective CPE (e.g., subscribers with a higher or richer subscription level may be provided enhanced "service" via e.g., association with a service group having more available bandwidth, and hence higher sustained bitrate). By grouping CPE based on service groups, the amount of adjustment of content delivery required can advantageously be reduced (as compared to adjusting the delivery on a CPE-to-CPE basis).

In yet another embodiment, the adjusting is performed by modifying the content associated with an available video profile based on the monitored one or more performance metrics. In one implementation, the modification of the content comprises transcoding the requested content into a different format. In another implementation, the modification comprises transrating the requested content into a different bitrate. By modifying the content, the content may be provided in a form suitable for delivery to a CPE based on existing network conditions identified from the monitored one or more performance metrics. For example, a CPE may request a video profile associated with content with a bitrate too large to deliver to a CPE based on current network conditions without experiencing some degradation in the user experience, such as long start-up delays or interruptions in content playback. Accordingly, the requested content may be transcoded into a different format, such as format with a reduced bitrate, which can be delivered to the requesting CPE under the currently existing network conditions. Therefore, as the modified content is perceived to be deliverable over the existing network conditions, such as available bandwidth for sending the content, the chance that the user's experience will be degraded due to problems in the delivery of the content may be mitigated.

At step 306, data relating to the adjustment is provided. By providing data related to the adjustment, entities responsible for selection of content may be informed with a priori information of the network as indicated by the monitored performance metrics. In one embodiment, the data relating to the adjustment is provided to a CPE to use when requesting video content. Accordingly, the CPE may be given feedback information regarding the network environment, such as network congestion, when making content selection decisions.

In one implementation, the data is provided to the CPE in the form of a data structure such as e.g., a manifest or index file. The manifest file lists the available formats and/or encodings of requested video content. Thus, the data relating to the adjustment may be in a form that prevents the CPE from requesting certain formats/encodings of the content, or otherwise identifying such formats/encodings as being undesirable for selection. For example, the manifest file may have otherwise available formats/encodings removed therefrom, thereby preventing the CPE from requesting such content, as the CPE does not possess the requisite information. In another implementation, the provided manifest file may indicate a default format/encoding to select when initially requesting the content to be delivered, essentially providing a "known good" starting point from which to continue operation. A salient advantage of providing the adjusted manifest file is that additional network congestion problems may be mitigated by preventing a CPE from requesting content at a quality that is not supportable by the current network condition of the CPE, which would otherwise fail in content delivery or need to be renegotiated by the CPE.

In another implementation, the provided data related to the adjustment comprises identifying one or more service groups of a plurality of CPE to a network entity responsible for content delivery. The network entity is configured to deliver content to a CPE based on the service group associated with the respective CPE. Therefore, CPE experiencing similar network conditions may be identified to the network apparatus and grouped into the same service group. For example, the service groups may be used in providing multicast delivery of content in a content delivery network, such as is described in co-owned U.S. patent applicant Ser. No. 13/835,388 filed on Mar. 15, 2013, entitled "APPARATUS AND METHODS FOR MULTICAST DELIVERY OF CONTENT IN A CONTENT DELIVERY NETWORK", and issued as U.S. Pat. No. 9,066,153 on Jun. 23, 2015, the foregoing being incorporated herein by reference in its entirety. One salient advantage of grouping CPE into service groups is that a suitable format of content may be selected for transmission based on the identified group such that the respective CPE will less likely to experience problems in content delivery, for example due to buffer underrun or failure of the content stream.

In another embodiment, the data related to the adjustment is a modifying a version of content requested by the CPE. The modified version is delivered to the requesting CPE in place of the requested content. In on implementation, the modification comprises transcoding the requested content into another format with a modified size. In another implementation, the modification comprises transrating the content into a different bitrate.

Exemplary CDN Apparatus—

Figure 4:
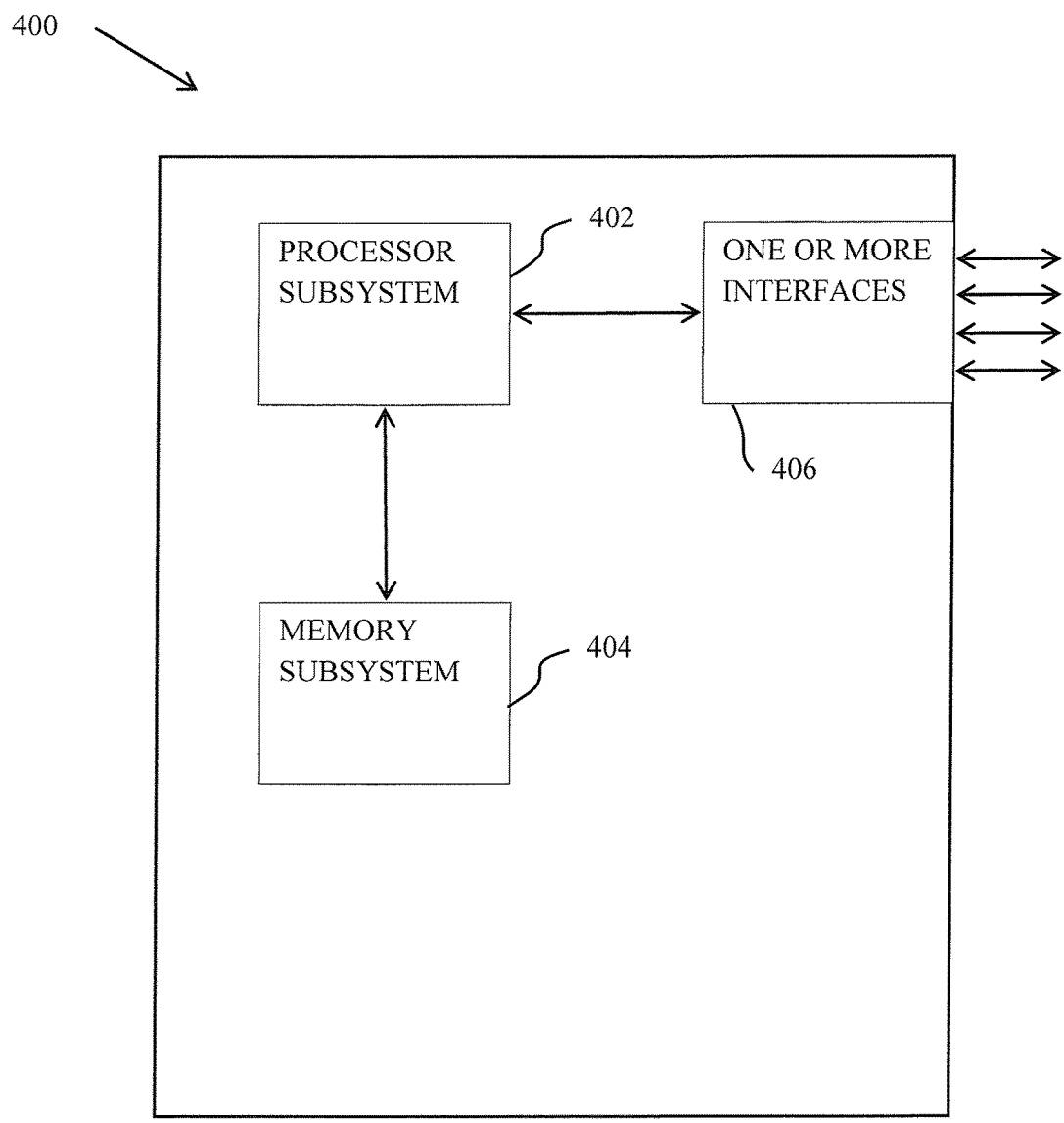
FIG. 4 is a functional block diagram illustrating one embodiment of a content delivery apparatus according to the present disclosure.

As noted above, the exemplary supervisory network entity (e.g., CDN Video Packager) of the disclosure may take on any number of different forms, including a server apparatus disposed on the CDN. Referring now to FIG. 4, one exemplary CDN server apparatus 400 configuration is shown. The server apparatus 400 in this configuration includes a processing subsystem 402 (e.g., processor) running a number of applications, a memory/storage subsystem 404 to support application execution, and one or more interfaces 406 to support connections to the CDN and various peripherals.

The exemplary interface(s) 406 comprise any number of high-speed data connections to facilitate the inclusion of the CDN server in the network, and the execution of the CDN's activities. The connections must supply bandwidth sufficient to support the incoming data related to monitored performance metrics from a network management entity, content requests, and providing content delivery files to service the content request, and include any of the interfaces necessary to support any of the network architectures discussed above. Such connections or interfaces may include for instance Gigabit Ethernet/10 G, IEEE-1394, Thunderbolt™, optical networking, and/or other well-known networking technologies.

In one embodiment, an application running on the processing subsystem 402 is configured to receive data related to the network condition status of one or more consumer devices over an interface 406. The received data is stored in the memory/storage subsystem 404, the latter which may include one or more types of RAM, ROM, flash and/or other mass storage devices such as HDDs, SSDs, and the like. The application is configured such that, upon receiving a request for content from one or more CPEs, the requesting CPE is compared against or used to access the stored data. The application is further configured to, based upon the accessed stored data, determine if there is a need to adjust content delivery for a requesting CPE. For example, the stored data may indicate that a requesting CPE is experiencing poor network performance (e.g., congestion and/or buffer underrun) that requires and adjustment of content delivery files associated with the requested content.

The application is further configured to adjust one or more content delivery files associated with the requested content of the requesting CPE. The adjustment may comprise for example removing one or more video profiles from the content delivery file, thereby removing the CPE's capability to request content using the removed video profiles. Alternatively, the adjustment may comprise identifying an initial video profile for the CPE to use to request the content. Additionally, the adjustment may comprise both removal and identification of video profiles, or yet other variants and combinations which will be recognized by those of ordinary skill given the present disclosure (such as e.g., delay of the availability of a profile, as contrasted with its complete removal from the manifest, with the "initial" profile being substituted during the delay period).

After the content delivery files have been adjusted, the application is further configured to transmit the adjusted content delivery files to one or more respective CPE over the one or more interfaces 406. By delivering the adjusted content delivery files to the requesting CPE, the CPE may select a suitable video profile to use for the content delivery given network conditions of which the CPE may not otherwise be aware. Thus, the CPE has an increased likelihood of selecting a video profile requiring a shorter negotiating time and/or reduce risk of delivery interruption/failure, thereby improving a user's QoE.

It is also noted that adjustment or evaluations relating to one CPE can be utilized on behalf of other similarly situated CPE, thereby obviating having to re-perform all or portions of the methodology described above. For example, the present disclosure contemplates that the network supervisory entity (e.g., Video Packager) can identify such similarly situated CPE passively, such as via rules or models based on network topology, service grouping, etc., without having to explicitly receive direct or actual monitored metrics from that CPE. As a simple illustration, two CPE being served by a common node of a network will likely be similarly constrained in the bandwidth available to receive IP packet content of a given bitrate, and hence active data indicating such congestion provided by the first CPE can be used as a basis of providing similar adjustments to the second CPE, without receiving any actual congestion data from the latter. In this fashion, anecdotal or algorithmic relationships or behaviors observed or theorized within the network can be used in an almost speculative fashion to proactively adjust manifest files for CPE which are not themselves actually providing monitoring data, such as e.g., those lacking the client application or ability to do so.

Likewise, intermediary entities within e.g., the managed network infrastructure can be used to aggregate congestion data for multiple CPE. For instance, where such intermediary node determines (whether actively, such as by direct reports from each CPE, or passively, such as via the aforementioned rules or algorithms) that a plurality of CPE are similarly affected, a single "multi-CPE" report may be sent to the supervisory entity, the latter which can implement adjustments for all affected CPE similarly).

It will also be appreciated that in other variants, an "anticipatory" adjustment to the manifest files may be made by the supervisory entity. For example, while the foregoing embodiments are generally reactive in nature (i.e., adjustments to relevant manifest files are made in response to specific content requests by one or more CPE), the present disclosure also contemplates the case where adjustment to content manifests (such as for example those associated with very often requested content) can be in advance of a request from a "congested" CPE. Hence, the supervisory entity might pre-stage two variants of the manifest; e.g., "congested" and "uncongested" to supply in response to a subsequent given request, depending on information available to the supervisory entity regarding the network serving the requesting one or more CPE. This approach may in some cases reduce the latency associated with modification/generation of the manifest file.

In other variants, the CDN server may be implemented one or more software routines on an extant network server providing other functions on the managed network.

It will also be appreciated that the functions of the CDN may be distributed over multiple network entities.

In yet other implementations, the CDN server may be disposed off of the managed network (e.g. on an Internet connected server, or a cloud computing entity).

It will also be appreciated that in some embodiments, the CDN service 400 may be partially disposed on the managed network and partially disposed on other networks (e.g. on an Internet server, or on the SPN, etc.). For example, the CDN server may receive content requests and supply content delivery files to devices of a managed network to service content hosted by a CDN external to the managed network.

It will be recognized that while certain aspects are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the techniques and architectures disclosed herein. This description is in no way meant to be limiting, but rather should be taken as illustrative of the general principles of the disclosure. The scope of the disclosure should be determined with reference to the claims.

What is claimed is:

1. A computerized network apparatus configured to deliver digitally rendered Internet-Protocol (IP) video content over a content delivery network, the computerized network apparatus comprising:
  processor apparatus;
  one or more network interfaces in data communication with the processor apparatus; and
  storage apparatus in data communication with the processor apparatus, the storage apparatus comprising at least one computer program configured to, when executed on the processor apparatus:
    utilize a plurality of service definition data to:
      (i) identify one or more second computerized client devices associated with a first computerized client device;
      (ii) determine a relationship between the first computerized client device and a plurality of data interfaces;
      (iii) identify one or more particular data interfaces of the plurality of data interfaces relevant to the delivery of the digitally rendered IP video content; and
      (iv) measure utilization of the one or more particular data interfaces of the plurality of data interfaces;
    based at least on the measured utilization of the one or more particular data interfaces of the plurality of data interfaces, adjust one or more of a plurality of content delivery files associated with the digitally rendered IP video content, the one or more adjusted content delivery files configured to permit at least one or the one or more second computerized client devices to receive the digitally rendered IP video content without a negative effect on Quality of Experience (QoE) a user of the at least one or the one or more second computerized client devices; and
    deliver the one or more adjusted content delivery files to the at least one or the one or more second computerized client devices via the first computerized client device.

2. The computerized network apparatus of claim 1, wherein each of the one or more content delivery files comprise a manifest file comprising data that at least lists a plurality of encoding formats of the digitally rendered IP video content that are available to be requested by the at least one or the one or more second computerized client devices.

3. The computerized network apparatus of claim 2, wherein the adjustment comprises an identification of one of the listed plurality of encoding formats as a default format to be requested by the at least one or the one or more second computerized client devices.

4. The computerized network apparatus of claim 2, wherein the adjustment comprises a removal of one or more of the plurality of encoding formats listed in the manifest file, the removal configured to prevent the at least one or the one or more second computerized client devices from requesting the removed one or more encoding formats.

5. The computerized network apparatus of claim 1, wherein the plurality of service definition data comprises at least one or more Internet Protocol Detail Record (IPDR) service definitions.

6. A computerized method for adjusting a delivery of content over a content delivery network, the computerized method comprising:
  determining one or more performance metrics, the one or more performance metrics indicative of one or more respective connection qualities of at least one cable modem (CM), the determining comprising:
    (i) identifying the one or more computerized client devices associated with the at least one CM, the identifying comprising relating one or more respective IP addresses associated with the one or more computerized client devices to at least one respective media access control (MAC) address associated with the at least one CM;
    (ii) identifying a channel of a plurality of channels by relating the at least one respective MAC address associated with the at least one CM to at least one channel identifier associated with the identified channel, the identified channel being relevant to a particular Internet Protocol (IP) service provided to at least one CM over the content delivery network; and
    (iii) determining utilization of the identified channel;
  based at least in part on the one or more determined performance metrics, causing an adjustment to content delivery for the at least one CM, the content delivery occurring via the identified channel and comprising the particular IP service, the adjustment comprising modifying data associated with an available video profile; and
  causing provision of the modified data to the at least one CM, the modified data configured to cause the at least one CM to provide the particular IP service to the one or more computerized client devices.

7. The computerized method of claim 6, wherein the causing the adjustment of the content delivery comprises causing editing of a manifest file associated with the particular IP service, the manifest file configured with a list of available versions of particular IP-based video content, the editing configured to indicate a particular version of the list of available versions for the one or more computerized client devices to select, the particular version configure to provide a lower start-up delay relative to other versions of the list of available versions under an existing network condition associated with the identified channel.

8. The computerized method of claim 7, wherein the editing of the manifest file comprises editing at least one of the available versions, each of the available versions having a different transmission or streaming bitrate associated therewith.

9. The computerized method of claim 6, further comprising:
  grouping the one or more computerized client devices and a plurality of other computerized client devices into one or more service groups based at least on the determined one or more performance metrics;
  wherein the adjusting content delivery for the at least one CM is further based upon the one or more service groups.

10. The computerized method of claim 9, wherein the grouping the one or more computerized client devices and the plurality of other computerized client devices into the one or more service groups comprises determining a level of similarity between the one or more computerized client devices and the plurality of other computerized client devices based at least on respective subscription levels associated with respect user accounts of the one or more computerized client devices and the plurality of other computerized client devices.

11. The computerized method of claim 6, further comprising:
receiving data representative of a request for particular digitally rendered video content from at least one of the one or more computerized client devices; and
delivering the requested digitally rendered video content consistent with the adjusted content delivery;
wherein the adjusting the content delivery is performed based on the receiving of the request.

12. The computerized method of claim 6, further comprising:
identifying a relationship between the at least one CM and one or more other user devices, the one or more other user devices having no performance metrics associated therewith; and
based at least in part on the identified relationship and the determining of the one or more performance metrics associated with the at least one CM, adjusting content delivery for the one or more other user devices;
wherein the relationship comprises sharing of a common node of the content delivery network between the at least one CM and the one or more other user devices.

13. The computerized method of claim 6, further comprising identifying one or more channels of the two or more channels that are not associated with the particular IP service;
wherein the determining the one or more performance metrics comprises ignoring data associated with the one or more channels of the two or more channels that are not associated with the particular IP service, thereby eliminating the data from the determining of the one or more performance metrics that incorrectly indicates the one or more respective connection qualities of the one or more computerized client devices with respect to the particular IP service.

14. A computer-readable apparatus having a non-transitory storage medium with at least one computer program stored thereon, the at least one computer program having a plurality of instructions which are configured to, when executed by a processor apparatus:
identify, based at least on first service definition data, a relationship between consumer premises equipment (CPE) and one or more computerized client devices associated with a content delivery network;
identify, based at least on second service definition data, a particular channel of a plurality of channels, the identification of the particular channel based at least on an association between the particular channel and Internet Protocol (IP)-based video service;
determine, based at least on third service definition data, one or more performance metrics associated with a network condition status of the particular channel, the network condition status affecting the one or more computerized client devices;
modify one or more content delivery files associated with individual digital video content of a plurality of available digitally rendered video content, the modification of the one or more content delivery files being configured to permit at least one of the one or more computerized client devices to receive, via the particular channel, the individual digital video content associated with the modified one or more content delivery files, the modification based at least in part on the one or more performance metrics; and
cause delivery, via at least a server entity, the one or more modified content delivery files to the CPE, the CPE configured to deliver the IP-based video service to at least one of the one or more computerized client devices based at least on the one or more modified content delivery files.

15. The computer-readable apparatus of claim 14, wherein the modification of the one or more content delivery files comprises an identification of an initial video quality level for the at least one of the one or more computerized client devices to use for a video content request, the identification based on the received data, the initial video quality level configured to preclude a buffer underrun condition at the at least one of the one or more computerized client devices.

16. The computer-readable apparatus of claim 14, wherein the server entity comprises a cloud computing entity of the content delivery network.

17. The computer-readable apparatus of claim 14, wherein the modification of the one or more content delivery files is performed upon detection of a change in one or more congestion levels associated with the CPE.

18. The computer-readable apparatus of claim 14, wherein:
the modification of the one or more content delivery files comprises an anticipatory modification made prior to a request for the digitally rendered video content, the anticipatory modification comprising generation of a first and a second variant of the one or more content delivery files; and
the plurality of instructions are further configured to, when executed by the processor apparatus:
based at least one the one or more congestion levels meeting or exceeding a prescribed level of congestion within at least a portion of the content delivery network, deliver, via at least the server entity, the first variant to the CPE; and
based at least one the one or more congestion levels being below the prescribed level of congestion within at least the portion of the content delivery network, deliver, via at least the server entity, the second variant to the CPE.

19. A computerized method for operating a content delivery network for content delivery, the computerized method comprising:
identifying, based at least on first service definition data, a relationship between at least one cable modem (CM) and one or more computerized client devices associated with a content delivery network;
identifying, based at least on second service definition data, a particular channel of a plurality of channels, the particular channel being associated with Internet Protocol (IP)-based video service configured for provision to at least one CM over the content delivery network;
determining, based at least on third service definition data, one or more performance metrics associated with a network condition status of only the particular channel, the network condition status affecting the identified one or more computerized client devices;
based at least in part on the one or more determined performance metrics, modifying one or more content delivery files for the at least one CM, the content delivery files associated with content delivery occurring via the particular channel, the content delivery comprising the IP-based video service; and delivering, via at least a server entity, the one or more modified content delivery files to at least one of the at least one CM.

20. The computerized method of claim 19, wherein:

the identifying the particular channel of the plurality of channels comprises identifying one or more channels of the plurality channels that are not associated with the IP-based video service; and the determining of the one or more performance metrics comprises removing data associated with the one or more channels of the plurality channels that are not associated with the IP-based video service, thereby preventing indication of an incorrect network condition associated with the at least one CM with respect to the IP-based video service.

\* \* \* \* \*